United States Patent
Kwon

(10) Patent No.: US 11,240,087 B2
(45) Date of Patent: Feb. 1, 2022

(54) REPEATER AND METHOD OF OPERATION THEREOF

(71) Applicant: SOLiD, INC., Seongnam-si (KR)

(72) Inventor: Nagwon Kwon, Gyeonggi-do (KR)

(73) Assignee: SOLiD, INC., Seongnam-si (KR)

(*) Notice: Subject to any disclaimer, the term of this patent is extended or adjusted under 35 U.S.C. 154(b) by 3 days.

(21) Appl. No.: 16/638,602

(22) PCT Filed: Jul. 5, 2019

(86) PCT No.: PCT/KR2019/008305
§ 371 (c)(1),
(2) Date: Feb. 12, 2020

(87) PCT Pub. No.: WO2020/009540
PCT Pub. Date: Jan. 9, 2020

(65) Prior Publication Data
US 2020/0177432 A1    Jun. 4, 2020

(30) Foreign Application Priority Data

Jul. 5, 2018  (KR) .......................... 10-2018-0078008
Jul. 4, 2019  (KR) .......................... 10-2019-0080625

(51) Int. Cl.
*H04W 4/00*    (2018.01)
*H04L 27/26*   (2006.01)
(Continued)

(52) U.S. Cl.
CPC ...... *H04L 27/2675* (2013.01); *H04J 11/0073* (2013.01); *H04J 11/0076* (2013.01);
(Continued)

(58) Field of Classification Search
CPC .............. H04W 72/042; H04W 76/27; H04W 72/0446; H04W 72/04; H04W 56/001;
(Continued)

(56) References Cited

U.S. PATENT DOCUMENTS

2008/0145057 A1* 6/2008 Lee ..................... H04W 88/085
                                                                    398/103
2012/0026941 A1* 2/2012 Ahmad ................. H04W 48/16
                                                                    370/328
(Continued)

FOREIGN PATENT DOCUMENTS

JP    2008-507192 A     3/2008
KR    10-2009-0126448 A   12/2009
(Continued)

OTHER PUBLICATIONS

Communication dated Dec. 28, 2020, issued by the Korean Intellectual Property Office in application No. 10-2019-0080625.
(Continued)

*Primary Examiner* — Atique Ahmed
(74) *Attorney, Agent, or Firm* — Sughrue Mion, PLLC

(57) ABSTRACT

A synchronization detection method of a repeater comprises receiving a communication signal comprising a plurality of synchronization signal blocks respectively belonging to different frequency ranges, determining a priority of a frequency range in which the plurality of synchronization signal blocks are to be detected based on signal level for each frequency range and detecting a synchronization signal block included in each frequency range according to the determined priority.

10 Claims, 6 Drawing Sheets

(51) Int. Cl.
| | | |
|---|---|---|
| *H04J 11/00* | (2006.01) | |
| *H04L 5/00* | (2006.01) | |
| *H04W 56/00* | (2009.01) | |
| *H04W 72/04* | (2009.01) | |

(52) U.S. Cl.
CPC ........ *H04L 5/0053* (2013.01); *H04L 27/2613* (2013.01); *H04W 56/001* (2013.01); *H04W 72/04* (2013.01)

(58) Field of Classification Search
CPC .............. H04L 27/2675; H04L 5/0053; H04L 27/2613; H04L 1/1812; H04J 11/0073; H04J 11/0076
See application file for complete search history.

(56) References Cited

U.S. PATENT DOCUMENTS

| | | | | |
|---|---|---|---|---|
| 2013/0017828 A1* | 1/2013 | Weng | ................ | H04W 36/0085 455/434 |
| 2014/0348094 A1* | 11/2014 | Charbit | ............... | H04W 56/001 370/329 |
| 2016/0212721 A1* | 7/2016 | Sheng | ................... | H04W 76/14 |
| 2017/0311250 A1* | 10/2017 | Rico Alvarino | ........ | H04W 4/70 |
| 2018/0013483 A1* | 1/2018 | Liang | ................... | H04B 7/0617 |
| 2018/0124718 A1* | 5/2018 | Ng | ...................... | H04W 56/001 |
| 2018/0139712 A1* | 5/2018 | Abedini | ................ | H04W 56/00 |

FOREIGN PATENT DOCUMENTS

| | | |
|---|---|---|
| KR | 10-2014-0087189 A | 7/2014 |
| KR | 10-2016-0020849 A | 2/2016 |
| KR | 10-2016-0082095 A | 7/2016 |
| WO | 2006/006828 A1 | 1/2006 |
| WO | 2013/061986 A1 | 5/2013 |
| WO | 2020/096166 A1 | 5/2020 |

OTHER PUBLICATIONS

International Search Report for PCT/KR2019/008305 dated Oct. 23, 2019 [PCT/ISA/210].
Extended European Search Report dated Apr. 7, 2021 in Application No. 19829911.7.
3GPP TSG-RAN WG4 Meeting #88, RAN4#87 Meeting Report, Gothenburg, Sweden, Aug. 20-24, 2018, vol. RAN WG4, No. Gothenburg, Sweden; Aug. 20, 2018-Aug. 24, 2018 Jun. 2, 2018, XP051531313, pp. 638-815 (931 pages total).
Notice of Reasons for Refusal dated May 18, 2021 from the Japanese Patent Office in JP Application No. 2020-512842.
Office Action for Korean Patent Application No. 10-2019-0080625 dated Sep. 24, 2021.
Spreadtrum Communications, R1-1717740, Cell searching with multiple SS blocks in wideband CC, 3GPP TSG R1 #90bis (Oct. 2017).

* cited by examiner

REPEATER AND METHOD OF OPERATION THEREOF

CROSS REFERENCE TO RELATED APPLICATIONS

This application is a National Stage of International Application No. PCT/KR2019/008305 filed Jul. 5, 2019, claiming priority based on Korean Patent Application No. 10-2018-0078008 filed Jul. 5, 2018 and Korean Patent Application No. 10-2019-0080625 filed Jul. 4, 2019.

TECHNICAL FIELD

The present disclosure relates to a repeater and a method of operating the same, and more particularly, to a repeater capable of determining a priority of a frequency range in which a plurality of synchronization signal blocks are to be detected based on signal level for each frequency range, and detecting a synchronization signal block included in each frequency range according to the determined priority, and a method of operating the repeater.

BACKGROUND ART

In general, in order to expand service coverage of a base station or to improve service quality, a relay system such as a communication repeater, an interference cancellation repeater, distributed antenna systems, and the like are used in a radio-shaded area where intensity of a signal is weak or a signal is difficult to reach.

5G new radio (NR) is a time division duplexing (TDD) scheme, and time synchronization with a base station is necessary for a relay system to support 5G NR. For the time synchronization, synchronization needs to be obtained by finding a primary synchronization signal (PSS) and a secondary synchronization signal (SSS). In the existing LTE, since PSS and SSS are always located at the center frequency, synchronization is obtained only by correlating PSS and SSS bands of the center frequency. However, eight PSSs and SSSs exist in the 5G NR and each of which is arbitrarily disposed in a frequency band for each base station. As a result, in order to obtain a correlation between the PSS and the SSS, the entire frequency band must be scanned, the synchronization detection time increases.

DESCRIPTION OF EMBODIMENTS

Technical Problem

Provided are a repeater capable of determining a priority of a frequency range in which a plurality of synchronization signal blocks are to be detected based on signal level for each frequency range, and detecting a synchronization signal block included in each frequency range according to the determined priority, and a method of operating the repeater.

Solution to Problem

According to an aspect of an embodiments, a synchronization detection method of a repeater comprises receiving a communication signal comprising a plurality of synchronization signal blocks respectively belonging to different frequency ranges; determining a priority of a frequency range in which the plurality of synchronization signal blocks are to be detected based on signal level for each frequency range; and detecting a synchronization signal block included in each frequency range according to the determined priority.

According to an aspect of an embodiments, each of the plurality of synchronization signal blocks may comprise a primary synchronization signal (PSS), a secondary synchronization signal (SSS), and a physical broadcast channel (PBCH).

According to an aspect of an embodiments, the synchronization detection method of the repeater may further comprise detecting synchronization using a correlation between the PSS and the SSS included in the detected synchronization signal block.

According to an aspect of an embodiments, the synchronization detection method of the repeater may further comprise generating a switching signal for switching uplink communication and downlink communication in the repeater using the detected synchronization.

According to an aspect of an embodiments, the determining of the priority of the frequency range in which the plurality of synchronization signal blocks are to be detected may comprise transforming the communication signal into a frequency domain and detecting signal level for each frequency range of the communication signal transformed into the frequency domain.

According to an aspect of an embodiments, the determining of the priority of the frequency range in which the plurality of synchronization signal blocks are to be detected may comprise determining a frequency range having large signal level as a high priority based on the signal level for each frequency range.

According to an aspect of an embodiments, a repeater may comprise a domain transform circuit configured to receive a communication signal comprising a plurality of synchronization signal blocks respectively belonging to different frequency ranges and to transform the received communication signal into a frequency domain; a power detector configured to measure signal level for each frequency range of the communication signal transformed into the frequency domain; and a synchronization detector configured to determine a priority of a frequency range in which the plurality of synchronization signal blocks are to be detected based on the measured signal level for each frequency range, and to detect a synchronization signal block included in each frequency range according to the determined priority.

According to an aspect of an embodiments, the repeater may further comprise plurality of uplink/downlink switches, each for switching uplink communication and downlink communication.

According to an aspect of an embodiments, the repeater may further comprise a switching signal generator configured to generate a switching signal for switching the plurality of uplink/downlink switches using the detected synchronization signal block.

According to an aspect of an embodiments, the synchronization signal block may comprise a primary synchronization signal (PSS), a secondary synchronization signal (SSS), and a physical broadcast channel (PBCH).

Advantageous Effects of Disclosure

Methods and devices according to an embodiment of the present disclosure may reduce inefficiency of detecting synchronization for the entire frequency band including a frequency band where no signal is exist by determining a priority of a frequency range in which a plurality of synchronization signal blocks are to be detected and detecting a synchronization signal block included in each frequency range according to the determined priority.

BRIEF DESCRIPTION OF DRAWINGS

The above and other aspects, features, and advantages of certain embodiments of the present disclosure will be more apparent from the following description taken in conjunction with the accompanying drawings, in which.

BEST MODE

Figure 1:
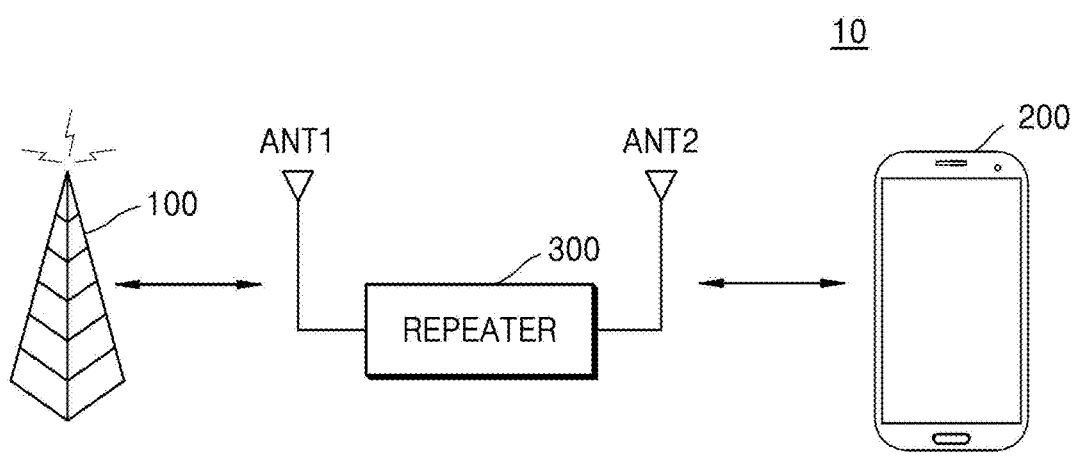
FIG. 1 is a conceptual diagram of a communication system according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

FIG. 1 is a conceptual diagram of a communication system according to an embodiment.

Referring to FIG. 1, a communication system 10 according to an embodiment may include a base station 100, a wireless communication terminal 200, and a repeater 300.

The repeater 300 may relay communication between the base station 100 and the wireless communication terminal 200.

According to an embodiment, the repeater 300 may relay a communication signal in a communication network composed of a 2G mobile communication network such as a global system for mobile communication (GSM) or code division multiple access (CDMA), a 3G mobile communication network such as wideband code division multiple access (WCDMA) or CDMA2000, a 3.5G mobile network such as high speed downlink packet access (HSDPA) or high speed uplink packet access (HSUPA), a 4G mobile network such as long term evolution (LTE) or LTE-Advanced, a 5G mobile network, a cloud radio access network (C-RAN), or a combination thereof.

The repeater 300 may receive a communication signal (e.g., a base station signal) received from the base station 100 through a first antenna ANT1 and may relay the received communication signal (e.g., the base station signal) to the wireless communication terminal 200 through a second antenna ANT2.

According to an embodiment, the communication signal may be a wireless communication signal (e.g., a radio frequency (RF) signal).

According to an embodiment, the communication signal may be a communication signal according to a 5G-new radio (5G-NR) standard.

The first antenna ANT1 may be referred to as a donor antenna and the second antenna ANT2 may be referred to as a service antenna or a coverage antenna, but are not limited thereto.

According to an embodiment, the repeater 300 may be implemented as a repeater for relaying a wireless communication signal such as an RF repeater or an interference cancellation system (ICS) repeater.

In FIG. 1, for convenience of description, the repeater 300 relays communication between one base station 100 and one wireless communication terminal 200, but may also relay communication between a plurality of base stations and a plurality of wireless communication terminals. According to another embodiment, the repeater 300 may relay communication between the base station 100 and another repeater (not shown).

Detailed structure and operation of the repeater 300 will be described in detail with reference to FIG. 2.

Figure 2:
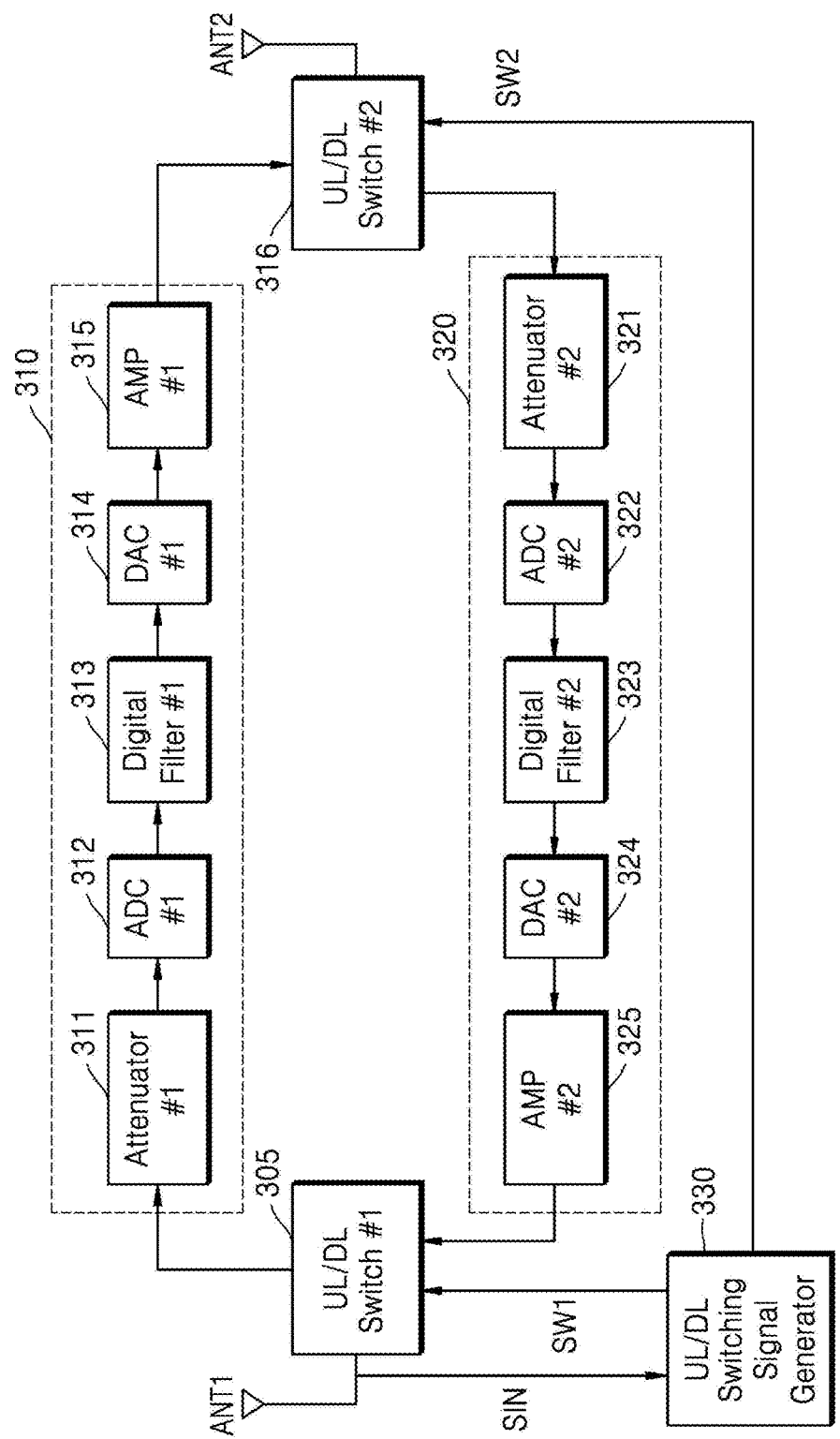
FIG. 2 is a block diagram according to an embodiment of a repeater shown in FIG. 1.

FIG. 2 is a block diagram according to an embodiment of the repeater shown in FIG. 1.

Referring to FIGS. 1 and 2, the repeater 300 may include a first uplink/downlink (UL/DL) switch 305, a downlink processing circuit 310, a second uplink/downlink switch 316, an uplink processing circuit 320, and an uplink/downlink switching signal generator 330.

The first uplink/downlink switch 305 may switch a moving path of a communication signal in the repeater 300 in uplink communication and downlink communication.

In downlink communication, the first uplink/downlink switch 305 may receive a communication signal received through the first antenna ANT1 and may switch a moving path of a communication signal to transmit the received communication signal to the downlink processing circuit 310.

In uplink communication, the first uplink/downlink switch 305 may receive a communication signal received through the uplink processing circuit 320 and may switch a moving path of a communication signal to transmit the received communication signal to the first antenna ANT1.

According to an embodiment, the first uplink/downlink switch 305 may remove noise of the communication signal received through the first antenna ANT1 in downlink communication, and may output the noise-removed communication signal by frequency down-conversion.

According to an embodiment, the first uplink/downlink switch 305 may transmit the communication signal received through the uplink processing circuit 320 in uplink communication to the base station 100 through the first antenna ANT1.

According to an embodiment, the first uplink/downlink switch 305 may linearize and output the communication signal received through the uplink processing circuit 320 in uplink communication.

The first uplink/downlink switch 305 may switch a moving path of a communication signal according to a first switching signal SW1 generated by the uplink/downlink switching signal generator 330.

The downlink processing circuit 310 may include a first attenuator 311, a first analog-to-digital converter (ADC) 312, a first digital filter 313, a first digital-to-analog converter (DAC) 314, and an amplifier 315.

The first attenuator 311 may attenuate the level of a communication signal received from the first uplink/downlink switch 305 and output the communication signal.

The first analog-to-digital converter 312 may digitally convert the communication signal that is attenuated and output by the first attenuator 311 and may output the digitally converted communication signal.

The first digital filter 313 may filter an interference signal included in the digitally converted communication signal and output only a signal of a bandwidth.

According to an embodiment, the first digital filter 313 may be implemented as a part of a digital signal processor.

Parameters of the first digital filter 313 (e.g., the type of filter (LPF, BPF, HPF, BSF, etc.), the center frequency of the filter, a passband of the filter, etc.) may be adjusted or set by a user, or may be adaptively adjusted according to a communication signal.

According to an embodiment, the first digital filter 313 may be implemented including a bandpass filter.

The first digital-to-analog converter 314 may convert a digital communication signal filtered by the first digital filter 313 into an analog communication signal and output the analog communication signal.

The amplifier 315 may amplify the analog communication signal output by the first digital-to-analog converter 314 and may output the amplified analog communication signal.

According to an embodiment, the amplifier 315 may be implemented as a low-noise amplifier.

The analog communication signal amplified and output by the amplifier 315 is transmitted to the second uplink/downlink switch 316.

The second uplink/downlink switch 316 may switch a moving path of a communication signal in the repeater 300 in uplink communication and downlink communication.

In downlink communication, the second uplink/downlink switch 316 may receive a communication signal received through the downlink processing circuit 310 and may switch a moving path of a communication signal to transmit the received communication signal to the second antenna ANT2.

In uplink communication, the second uplink/downlink switch 316 may receive a communication signal received through the second antenna ANT1 and may switch a moving path of a communication signal to transmit the received communication signal to the uplink processing circuit 320.

According to an embodiment, the second uplink/downlink switch 316 may transmit the communication signal received through the downlink processing circuit 310 in downlink communication to the base station 100 through the second antenna ANT2.

According to an embodiment, the second uplink/downlink switch 316 may linearize and output the communication signal received through the downlink processing circuit 310 in downlink communication.

According to an embodiment, the second uplink/downlink switch 316 may remove noise of the communication signal received through the second antenna ANT2 in uplink communication, and may output the noise-removed communication signal by frequency down-conversion.

The second uplink/downlink switch 316 may switch a moving path of a communication signal according to a second switching signal SW2 generated by the uplink/downlink switching signal generator 330.

The uplink/downlink switching signal generator 330 may receive a communication signal SIN received by the repeater 300 and may generate switching signals SW1 and SW2 for switching the uplink/downlink switches 305 and 316 based on the input communication signal SIN.

Detailed structure and operation of the uplink/downlink switching signal generator 330 will be described later with reference to FIG. 3 to FIG. 5.

The second uplink/downlink switch 316 may receive the communication signal received through the second antenna ANT2 in uplink communication and may transmit the received communication signal to the uplink processing circuit 320.

The uplink processing circuit 320 may include a second attenuator 321, a second analog-to-digital converter 322, a second digital filter 323, a digital-to-analog converter 324, and an amplifier 325.

Each component (321 to 325) of the uplink processing circuit 320 may perform signal processing substantially the same as that of each component (311 to 315) of the downlink processing circuit 310 in the reverse direction.

Figure 3:
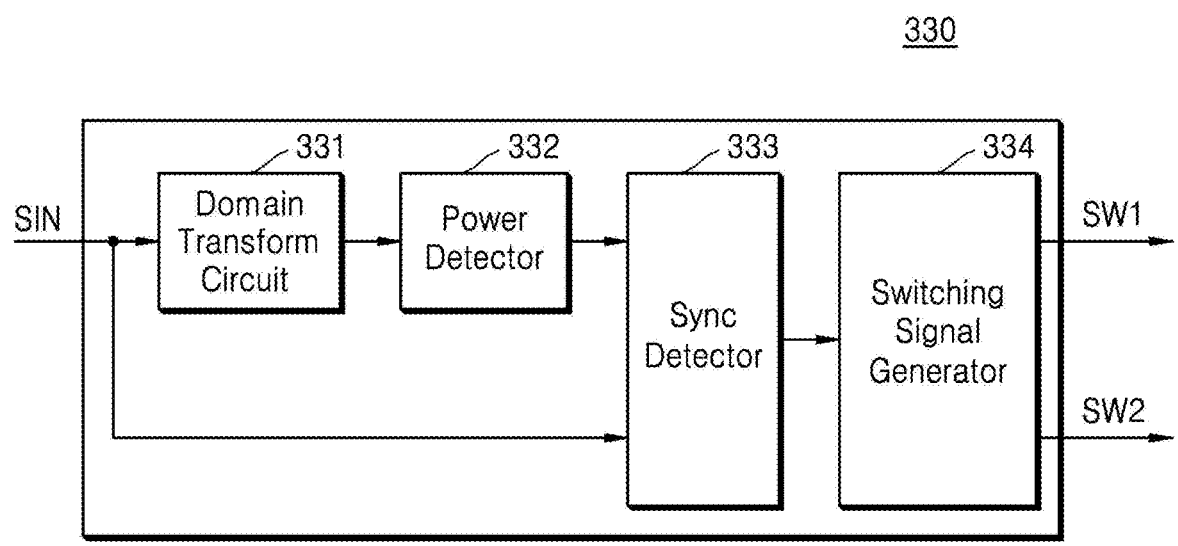
FIG. 3 is a block diagram according to an embodiment of an uplink/downlink switching signal generator shown in FIG. 2.

FIG. 3 is a block diagram according to an embodiment of an uplink/downlink switching signal generator shown in FIG. 2. FIG. 4 is an exemplary view of a synchronization signal block included in a communication signal serviced by a repeater according to an embodiment. FIG. 5 is a view of an example in which a plurality of synchronization signal blocks are included in a communication signal serviced by a repeater according to an embodiment.

Referring to FIGS. 2 and 3, the uplink/downlink switching signal generator 330 may include a domain transform circuit 331, a power detector 332, a synchronization detector 333, and a switching signal generator 334.

The domain transform circuit 331 may transform the communication signal SIN received by the repeater 300 into a frequency domain.

According to an embodiment, the domain transform circuit 331 may transform the communication signal SIN received by the repeater 300 into a frequency domain through a Fast Fourier Transform (FFT).

The power detector 332 may measure signal level for each frequency range of the communication signal SIN transformed into a frequency domain by the domain transform circuit 331.

According to an embodiment, when a frequency range of the communication signal SIN is divided into a first frequency range f1 to f2, a second frequency range f2 to f3, and a third frequency range f3 to f4, the power detector 332 may measure each of signal level of a signal component in the first frequency range f1 to f2, signal level of a signal component in the second frequency range f2 to f3, and signal level of a signal component in the third frequency range f3 to f4.

The synchronization detector 333 may determine a priority of a frequency range for detecting a plurality of synchronization signal blocks in the communication signal SIN based on the signal level for each frequency range measured by the power detector 332.

According to an embodiment, if the order of the signal level for each frequency range is the order of the third frequency range f3 to f4, the first frequency range f1 to f2, and the second frequency range f2 to f3, the synchronization detector 333 may determine a priority of a frequency range for detecting a plurality of synchronization signal blocks in the communication signal SIN in the same order.

According to an embodiment, a plurality of synchronization signal blocks may belong to different frequency ranges.

Figure 4:
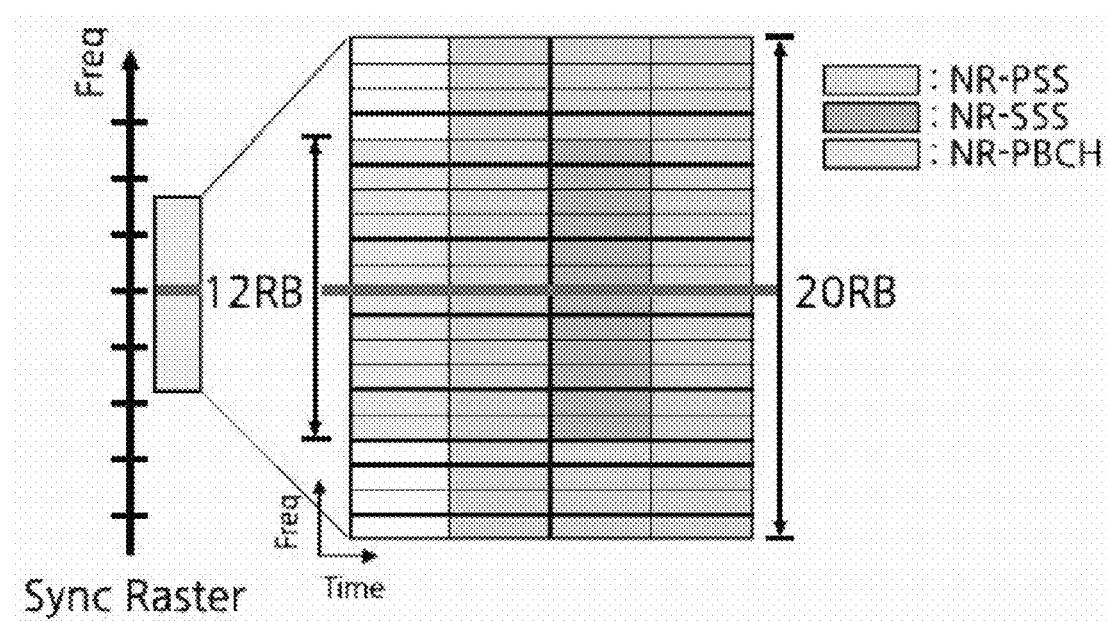
FIG. 4 is an exemplary view of a synchronization signal block included in a communication signal serviced by a repeater according to an embodiment.
Figure 5:
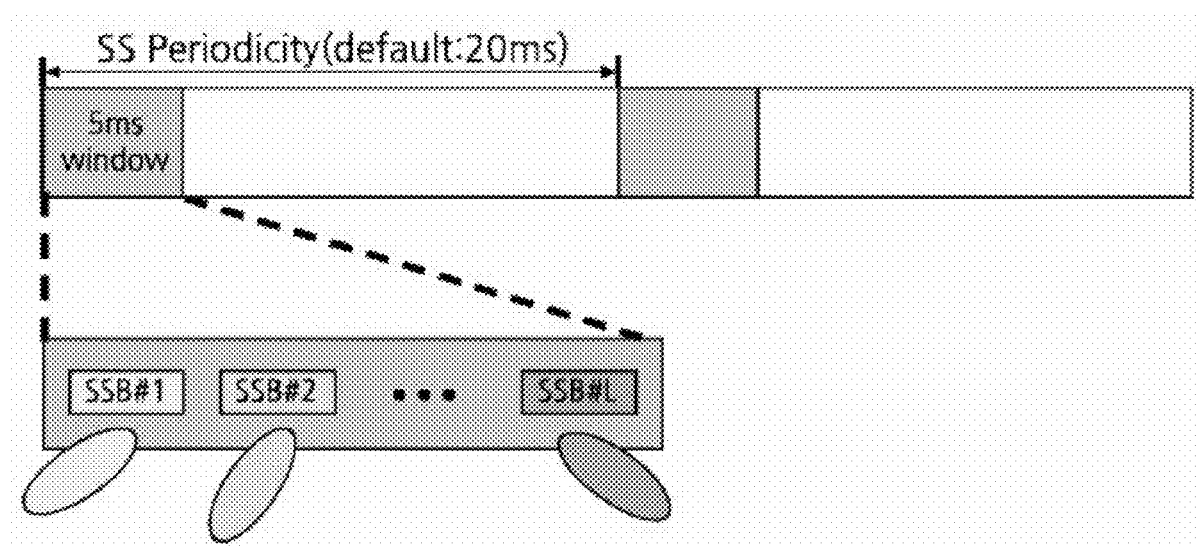
FIG. 5 is a view of an example in which a plurality of synchronization signal blocks are included in a communication signal serviced by a repeater according to an embodiment.

Referring to FIGS. 4 and 5, a synchronization signal block SSB is illustrated when a communication signal relayed by the repeater 300 is a communication signal according to a 5G-NR standard.

According to an embodiment, the synchronization signal block SSB may include four orthogonal frequency division multiplexing (OFDM) symbols and 20 resource blocks (RBs) as shown in FIG. 4.

According to an embodiment, the synchronization signal block SSB may include an NR-primary synchronization signal (PSS), an NR-secondary synchronization signal (SSS), and an NR-physical broadcast channel (PBCH).

FIG. 4 shows a candidate frequency position (synchronization raster) defined to find the synchronization signal block SSB as an example. However, according to an embodiment, regardless of the candidate frequency position, the order of frequency ranges for finding the synchronization signal block SSB may be determined based on signal level for each frequency range.

According to another embodiment, the frequency ranges may be determined based on the candidate frequency position.

According to an embodiment, when there are a plurality of synchronization signal blocks SSB #1 to SSB #L belonging to different frequency ranges as shown in FIG. 5, the synchronization detector 333 may determine a frequency range having large signal level as a high priority based on the signal level for each frequency range, and may detect the synchronization signal block SSB with a priority for the frequency range having a high priority.

According to an embodiment, the synchronization detector 333 may detect synchronization using a correlation between the NR-PSS and the NR-SSS included in the synchronization signal block SSB.

The switching signal generator 334, by using the synchronization detected by the synchronization detector 333, may generate the switching signals SW1 and SW2 for switching the uplink/downlink switches 305 and 316 included in the repeater 300.

Figure 6:
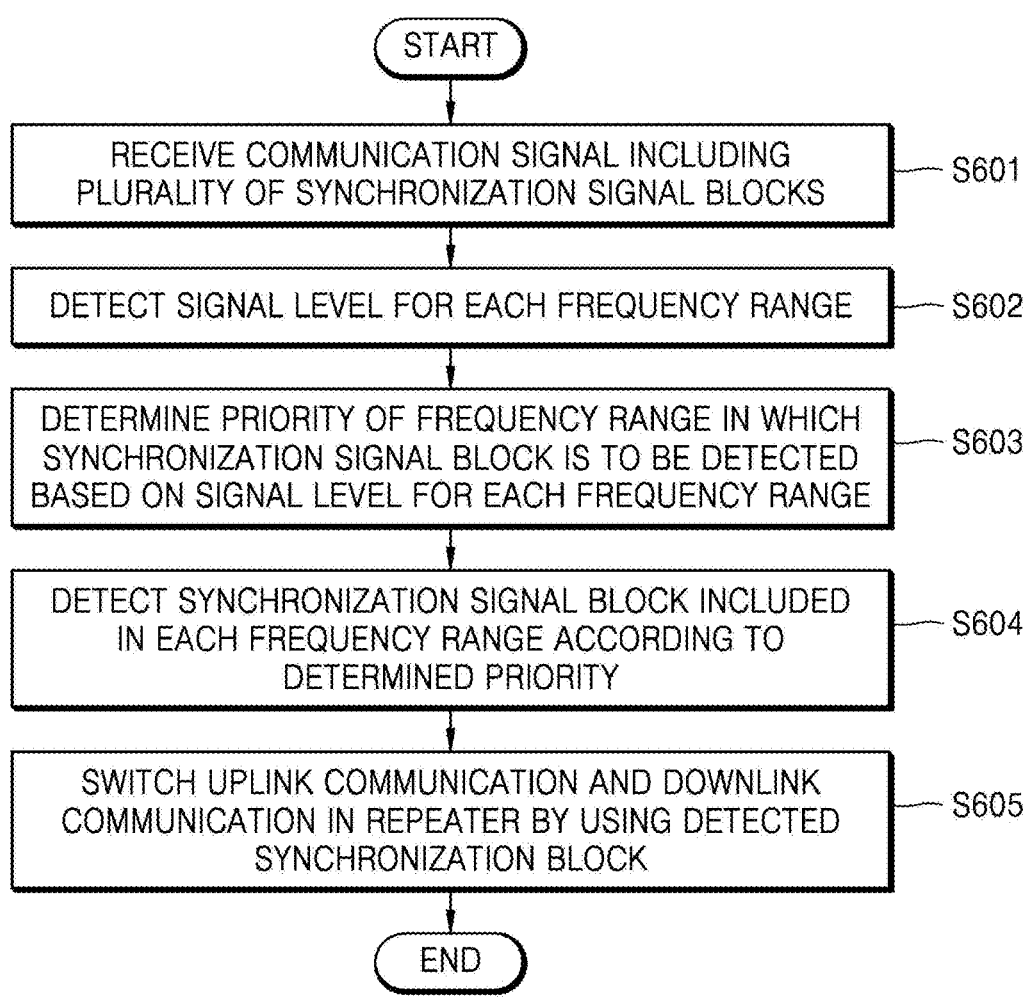
FIG. 6 is a flowchart of a method of operating a repeater according to an embodiment.

FIG. 6 is a flowchart of a method of operating the repeater 300 according to an embodiment.

Referring to FIGS. 1 to 6, in operation S601, the repeater 300 may receive a communication signal including a plurality of synchronization signal blocks SSBs respectively belonging to different frequency ranges.

In operation S602, the repeater 300 may detect signal level for each frequency range of the received communication signal.

According to an embodiment, the repeater 300 may transform the received communication signal into a frequency domain and then detect signal level of a corresponding frequency component for each frequency range.

In operation S603, the repeater 300 may determine a priority of a frequency range in which the synchronization signal block SSB is to be detected based on the signal level for each frequency range.

According to an embodiment, the repeater 300 may determine a high priority for a frequency range having large signal level.

In operation S604, the repeater 300 may detect a synchronization signal block included in each frequency range of a communication signal according to the determined priority.

According to an embodiment, the repeater 300 may preferentially detect a synchronization signal block for a frequency range having a high priority.

In operation S605, the repeater 300 may switch uplink communication and downlink communication in the repeater 300 by using detected synchronization signal block.

According to an embodiment, the repeater 300 may switch the uplink/downlink switches 305 and 316 in the repeater 300 using the detected synchronization.

While the present disclosure has been particularly shown and described with reference to embodiments thereof, it will be understood that various changes in form and details may be made therein without departing from the spirit and scope of the following claims.

The invention claimed is:

1. A synchronization detection method of a repeater, the method comprising:
   receiving a communication signal comprising a plurality of synchronization signal blocks respectively belonging to different frequency ranges;
   determining a priority of a frequency range in which the plurality of synchronization signal blocks are to be detected based on signal level for each frequency range;
   detecting a synchronization signal block existing at arbitrary positions within each frequency range according to the determined priority; and
   when the synchronization signal block is detected in a first frequency range, detecting synchronization based on the detected synchronization signal block without performing detection of the synchronization signal block in a second frequency range having a lower priority than the first frequency range.

2. The method of claim 1, wherein each of the plurality of synchronization signal blocks comprises:

a primary synchronization signal (PSS), a secondary synchronization signal (SSS), and a physical broadcast channel (PBCH).

3. The method of claim 2, wherein the detecting synchronization using the detected synchronization signal block includes:
  detecting synchronization using a correlation between the PSS and the SSS included in the detected synchronization signal block.

4. The method of claim 3, further comprising:
  generating a switching signal for switching uplink communication and downlink communication in the repeater using the detected synchronization.

5. The method of claim 1, wherein the determining of the priority of the frequency range in which the plurality of synchronization signal blocks are to be detected comprising:
  transforming the communication signal into a frequency domain and detecting signal level for each frequency range of the communication signal transformed into the frequency domain.

6. The method of claim 1, wherein the determining of the priority of the frequency range in which the plurality of synchronization signal blocks are to be detected comprising:
  determining a frequency range having large signal level as a high priority based on the signal level for each frequency range.

7. A repeater comprising:
  a domain transform circuit configured to receive a communication signal comprising a plurality of synchronization signal blocks respectively belonging to different frequency ranges and to transform the received communication signal into a frequency domain;
  a power detector configured to measure signal level for each frequency range of the communication signal transformed into the frequency domain; and
  a synchronization detector configured to determine a priority of a frequency range in which the plurality of synchronization signal blocks are to be detected based on the measured signal level for each frequency range, and to detect a synchronization signal block existing at arbitrary positions within each frequency range according to the determined priority, and
  wherein the synchronization detector is configured to, when the synchronization signal block is detected in a first frequency range, detect synchronization based on the detected synchronization signal block without performing detection of the synchronization signal block in a second frequency range having a lower priority than the first frequency range.

8. The repeater of claim 7, further comprising:
  a plurality of uplink/downlink switches, each for switching uplink communication and downlink communication.

9. The repeater of claim 8, further comprising:
  a switching signal generator configured to generate a switching signal for switching the plurality of uplink/downlink switches using the detected synchronization.

10. The repeater of claim 9, wherein the synchronization signal block comprising:
  a primary synchronization signal (PSS), a secondary synchronization signal (SSS), and a physical broadcast channel (PBCH).

* * * * *